United States Patent [19]
Yoshizawa et al.

[11] Patent Number: 6,021,450
[45] Date of Patent: Feb. 1, 2000

[54] COMBINING PLURAL DATA LINES AND CLOCK LINES INTO SET OF PARALLEL LINES AND SET OF SERIAL LINES

[75] Inventors: Jinichi Yoshizawa; Hiroichi Nara; Junichi Tamura; Masao Hayashi, all of Kawasaki, Japan

[73] Assignee: Fujitsu Limited, Kawasaki, Japan

[21] Appl. No.: 08/923,519

[22] Filed: Sep. 4, 1997

[30] Foreign Application Priority Data

Dec. 9, 1996 [JP] Japan .................................. 8-328372

[51] Int. Cl.[7] ............................................. G06F 13/00
[52] U.S. Cl. ............................................................. 710/128
[58] Field of Search ........................... 709/253; 710/126, 710/127, 128

[56] References Cited

U.S. PATENT DOCUMENTS 5,590,284  12/1996  Crosetto ........................... 395/200.05
5,596,724   1/1997  Mullins et al. ........................ 395/250

*Primary Examiner*—Lance Leonard Barry
*Attorney, Agent, or Firm*—Staas & Halsey

[57] ABSTRACT

A data transfer system includes a plurality of functional blocks each provided with a function module for controlling data transfer between memories of the plurality of functional blocks, by being connected to a function module of other functional blocks via n sets of data signal lines and clock signal lines so that the data transfer proceeds in a synchronized manner. Each of the n sets of data signal lines and clock signal lines is appropriately combined with one another depending on a required condition for communicating with destination functional blocks, such that a plurality of sets of data signal lines and clock signal lines are used for parallel transfer and a single set of a data signal line and a clock signal line is used for serial transfer.

7 Claims, 8 Drawing Sheets

FIG. 5

|    | ① | ② | ③ | ④ | ⑤ |
|----|----|----|----|----|----|
| P1 | L1 | L1 | L1 | L1 | L1 |
| P2 | L2 |    |    |    |    |
| P3 | L3 | L2 | L2 |    |    |
| P4 | L4 | L3 |    | L2 |    |

Pn:PHYSICAL PORT NUMBER
Lm:LOGICAL PORT NUMBER

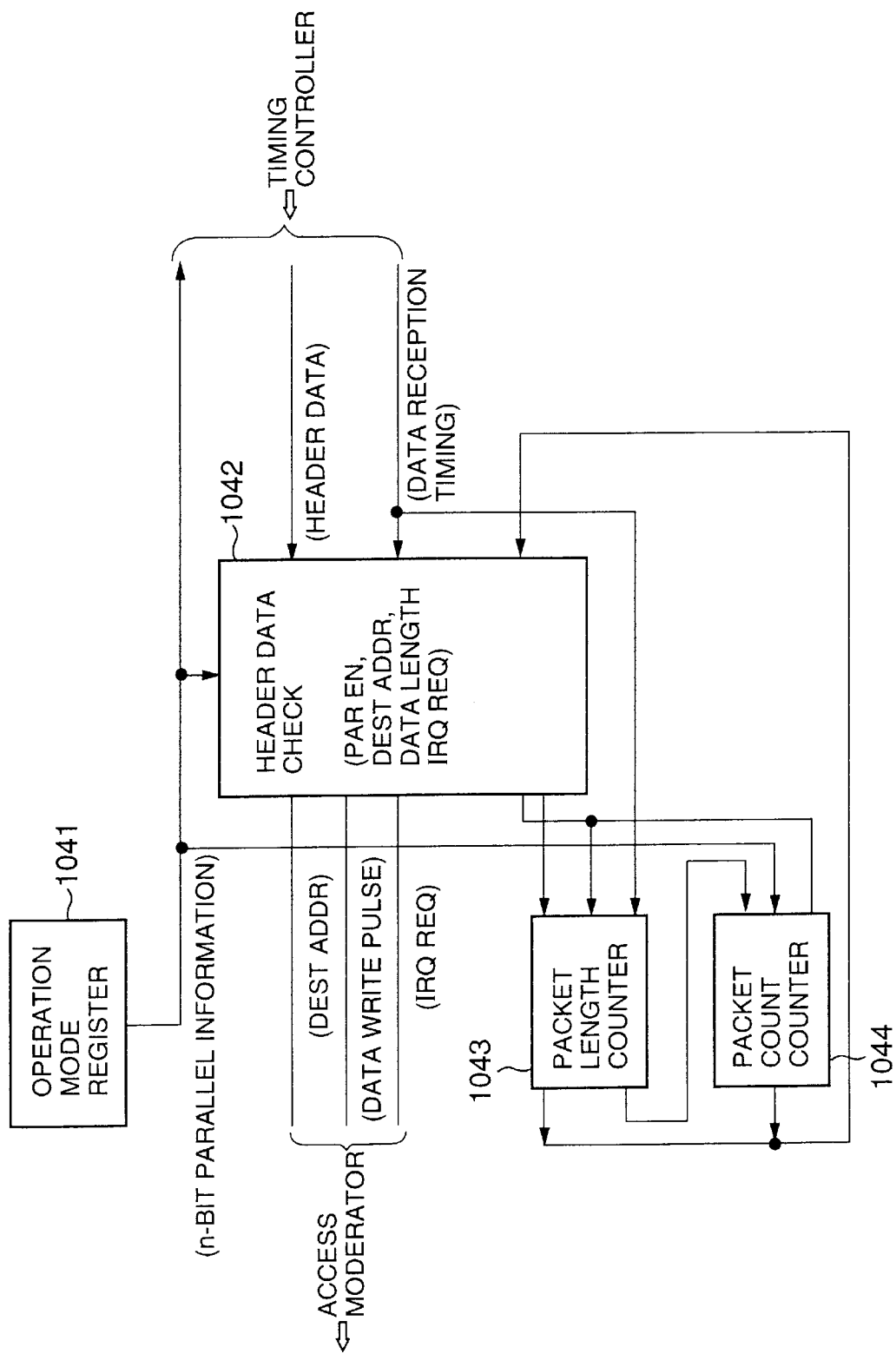

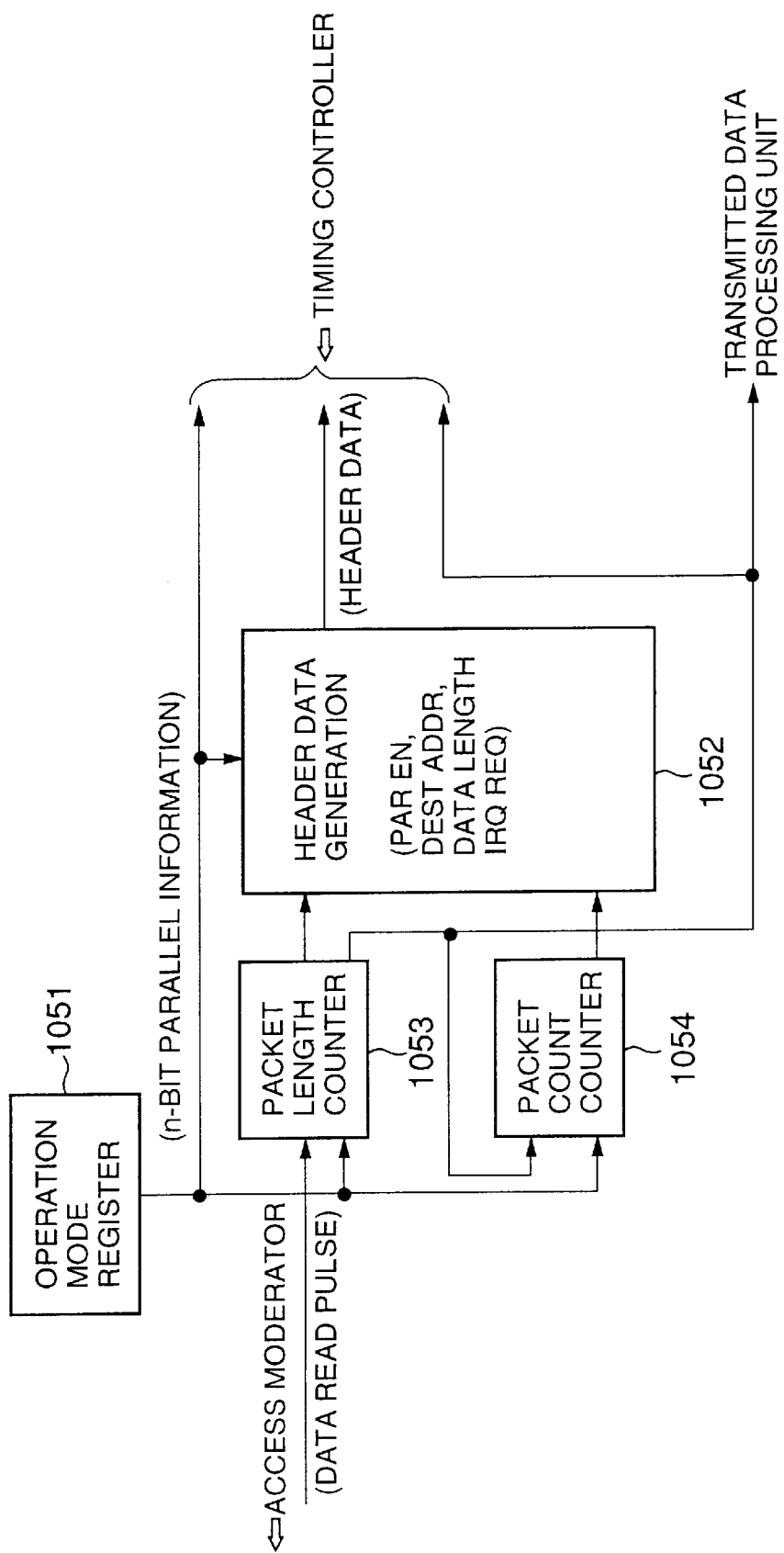

COMBINING PLURAL DATA LINES AND CLOCK LINES INTO SET OF PARALLEL LINES AND SET OF SERIAL LINES

BACKGROUND OF THE INVENTION

1. Field of the Invention

The present invention generally relates to methods of transferring data between memories and, more particularly, to a method of transferring data between memories in respective functional blocks, such as a bus master (for example, a microprocessor unit) and a peripheral block.

It is often requested that a system using a microprocessor unit (MPU) be expandable in units of functional blocks, each thereof constituting a peripheral device for the microprocessor. It may also be requested for a system to be constituted of a plurality of functional blocks each carrying a microprocessor unit. There is a growing demand that the speed of data transfer between such functional blocks be increased and for the system size to be smaller (i.e., reduced in size from conventional such systems).

2. Description of the Related Art

If a peripheral device of a system using an MPU is divided into a plurality of functional blocks so that the system is expandable in units of functional blocks, or if a system is constituted of a plurality of functional blocks, each carrying an MPU, data communication between the functional blocks is necessary. Such data communication occurs between functional modules, provided in respective functional blocks for data transfer control. In the related art, the data transfer between functional modules is performed in the following ways.

(1) In addition to data, an address and a control signal for writing the data in and reading the data out from a memory are supplied over a parallel bus between a plurality of blocks (for example, an MPU bus).

(2) A function module specifically adapted for a destination functional block is provided so that data communication is fixedly controlled to occur in a serial mode or in a parallel mode (for example, serial communication by Ethernet and RS-232C).

In the related art, parallel data transfer between function modules is employed when a high transfer rate is required. When it is preferred that hardware scale (the number of connected signal lines) be reduced, serial transfer is employed. A function module supports only one of the serial transfer and parallel transfer modes.

For this reason, the method of transferring data between memories according to the related art has a disadvantage in that the hardware scale would be excessively large when functional blocks, not requiring a large amount of data to be transferred therebetween, are fixedly controlled to the parallel transfer mode, and in that, when functional blocks requiring a large amount of data to be transferred therebetween are fixedly controlled to the serial transfer mode, a long data transfer time is required and communication control is necessary for each serial transfer.

SUMMARY OF THE INVENTION

Accordingly, an object of the present invention is to provide a method of transferring data between memories in which the aforementioned disadvantage is eliminated.

Another and more specific object of the present invention is to provide a method of transferring data between memories in which size reduction and transfer rate improvements are achieved.

The aforementioned objects of the present invention are achieved by a data transfer system for transferring data between a plurality of functional blocks. Each of said plurality of functional blocks comprises a memory storing incoming and outgoing data; a processor processing data; and a function module controlling data transfer between said memories of said plurality of functional blocks. The function module is connected to a function module of other functional blocks via n sets of data signal lines and clock signal lines so that the data transfer proceeds in a synchronized manner, wherein each of the n sets of data signal lines and clock signal lines is appropriately combined with one another depending on a required condition for communicating with destination functional blocks, and such that a plurality of sets of data signal lines and clock signal lines are used for parallel transfer and a single set of a data signal line and a clock signal line is used for serial transfer.

According to the present invention, a function module provides for both serial transfer and parallel transfer. Thus, a transfer mode adapted for a communication condition (data transfer size/transfer rate/hardware scale) of the relevant functional blocks can be used for communication. Conventionally, communication control was necessary for individual serial transfers repeated for improvement of performance. The present invention eliminates such individual serial communication control.

In a parallel transfer using a plurality of sets of data signal lines and clock signal lines, synchronization information (flag pattern and the like) identifying a head of a frame of transferred data may be carried only in a single set of a data signal line and a clock signal line. In this way, it is not necessary to provide prescriptions for data process in the event of disagreement in the plurality of sets of signal lines occurring due to an erroneous detection of the synchronization information.

The data transfer system may also be constructed such that, in a parallel transfer, communication control information (header information and the like) in transferred data is carried only in a single set of a data signal line and a clock signal line. In this way, it is not necessary to provide prescriptions for data process in the event of disagreement in the plurality of sets of signal lines occurring due to an erroneous detection of the communication control information.

The data transfer system may also be constructed such that an error check code is carried in the plurality of sets of data signal lines and clock signal lines used in the parallel transfer. In this way, error detection in individual physical ports in the function module is possible.

The transferred data may be divided into a plurality of transferred packets such that each transferred packet has a variable packet length smaller than a maximum packet length, thus enabling error detection in individual transferred packets and reduction in a packet length when a size of the data transferred is relatively small.

In the conventional fixed-length packet transfer controlled by the MPU (firmware), the MPU must factor in the packet length, for proper communication. According to the invention, however, it is not necessary for the firmware to factor in the packet length.

The function module could be configured so as to have hardware capability of automatically dividing the transferred data into a plurality of transferred packets before the data transfer, when the packet length of the transferred data exceeds the maximum packet length. Accordingly, the firmware need not factor in the packet length.

Information for enabling or disabling an interruption to the processor in a data transfer destination functional block may be inserted in the transferred data so that a first processor of a first functional block is capable of generating an interruption to a second processor of a second functional block and vice versa, without a signal line connecting functional blocks for interruption.

BRIEF DESCRIPTION OF THE DRAWINGS

Other objects and further features of the present invention will be apparent from the following detailed description when read in conjunction with the accompanying drawings, in which:

FIG. 5 shows combinations of connection ports;

FIG. 7 shows a detailed construction of the reception operation control unit; and FIG. 8 shows a detailed construction of the transmission operation control unit.

DESCRIPTION OF THE PREFERRED EMBODIMENTS

Figure 1:
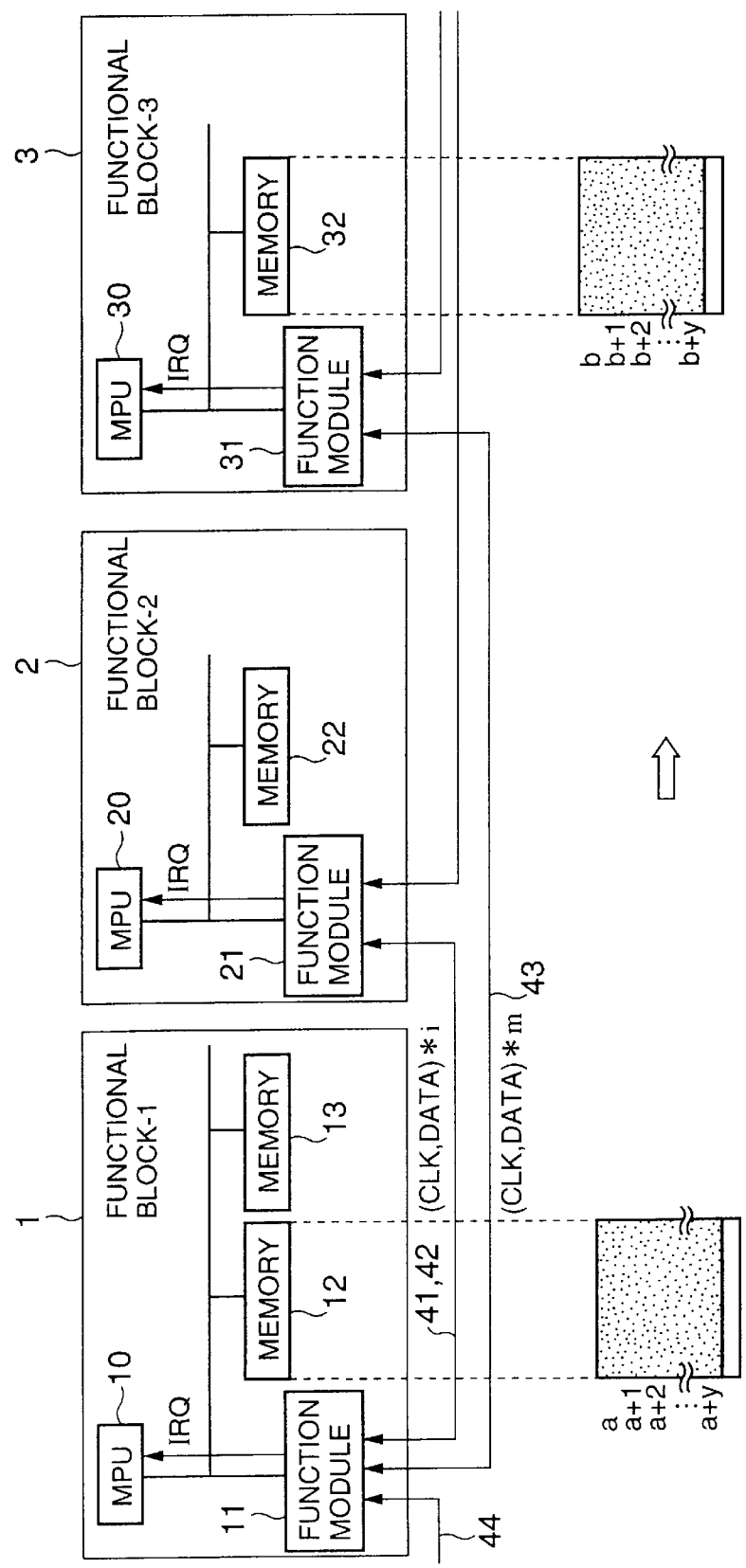
FIG. 1 is a block diagram of a system for transferring data between memories according to an embodiment.

FIG. 1 is a block diagram of a system of transferring data between memories according to an embodiment of the present invention. A functional block 1 accommodates an MPU 10, a function module 11, and memories 12 and 13. A functional block 2 accommodates an MPU 20, a function module 21, and a memory 22. A functional block 3 accommodates an MPU 30, a function module 31, and a memory 33. While FIG. 1 shows only three functional blocks 1–3, the system may include other functional blocks.

The function module 11 of the functional block 1 has, for example, four ports. Signal line sets 41–44 for carrying data signals and clock signals are connected to the four ports. Each of the signal line sets 41–44 is composed of a transmitted data line SDATA, a transmitted clock line SCLK, a received data line RDATA, and a received clock line RCLK. Illustration of the individual lines is omitted. As shown in FIG. 1, a plurality of functional blocks are connected to each other by the signal line sets 41–44 carrying data and clock signals synchronized with the data so that packet data synchronized with the clock is transferred between memories of the respective functional blocks (DMA transfer).

The function module 11 of the functional block 1 is connected in parallel to the function module 21 of the function block 2 via two signal line sets 41 and 42, and is connected to the function module 31 of the functional block 3 via the signal line set 43. Functional blocks may be connected to each other via one port or a plurality of ports depending on the amount of data to be transferred, the transfer time required between the functional blocks, and the hardware scale of the functional blocks.

Figure 3:
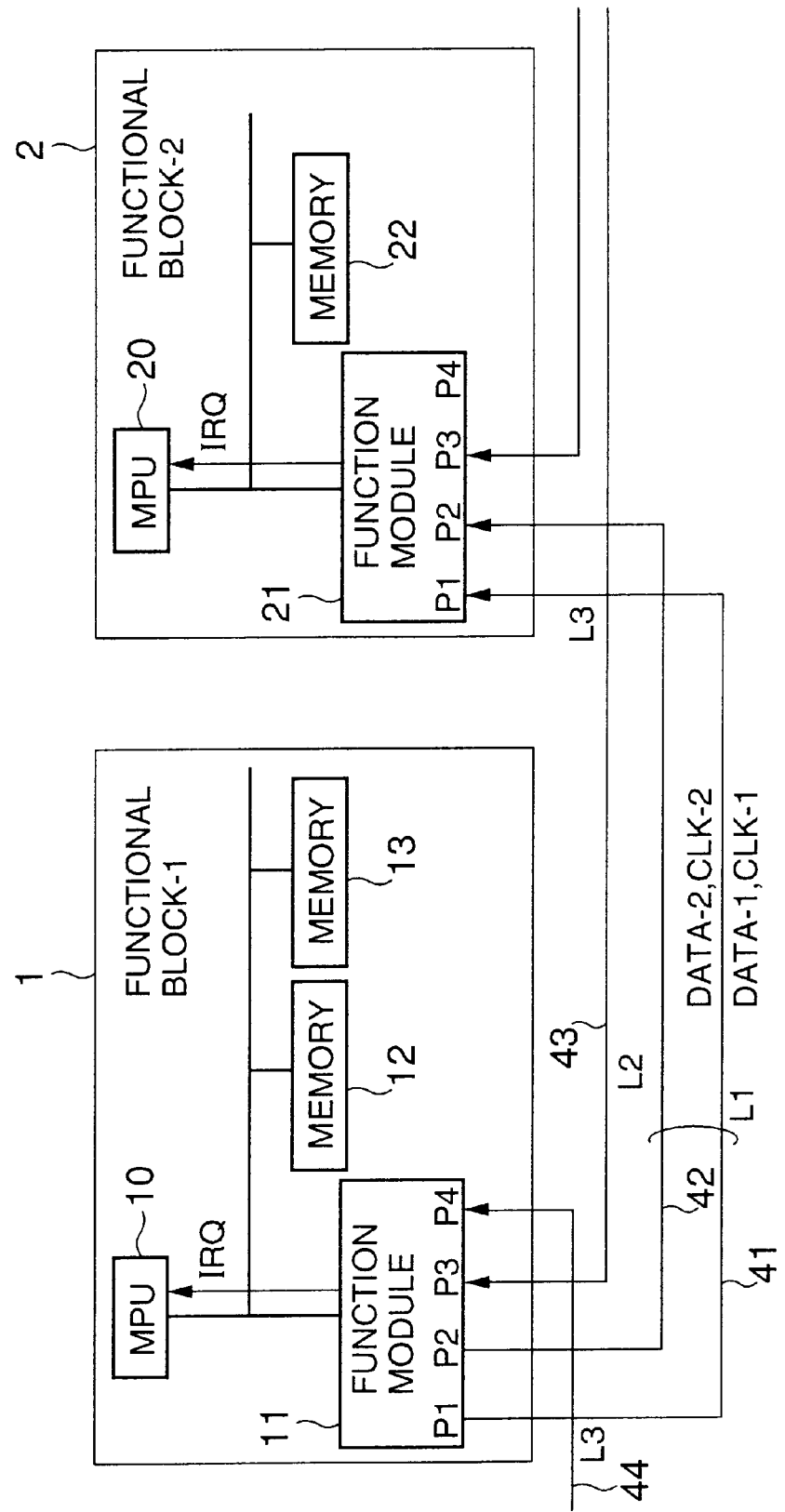
FIG. 3 shows a detailed construction of parallel connection between functional blocks.

FIG. 3 shows a detailed construction of a parallel connection between the functional block 1 and the functional block 2. As shown in FIG. 3, provided that each of the function modules 11 and 21 is provided with four ports P1–P4, the ports P1 and P2 of the function module 11 of the functional block 1 may be connected to the ports P1 and P2, respectively, of the function module 21 of the functional block 2 via the signal line sets 41 and 42. The port P3 of the function module 11 of the functional block 1 may be connected to the functional block 3 via the signal set 43. The port P4 of the function module 11 of the functional block 1 may be connected to another function block (not shown) via the signal line set 44.

A description will now be given of a basic operation of the above system for transferring data between memories.

First, serial data transfer between the functional block 1 and the functional block 3 will be described.

A data line for carrying data and a clock line for carrying a clock synchronized with the data connect the functional block 1 and the functional block 3, and the MPU 10 in the functional block 1 transfers data in the memory 12 to the MPU 30 via the memory 32 in the functional block 3. The MPU 10 in the functional block 1 notifies the function module 11 of the location (in this case, the area in the memory 12 indicated by "a"), of the data to be transferred, the amount (in this case, the amount indicated by "y") of the data transferred, the destination functional block (in this case, the functional block 3), the destination memory (in this case, the memory 32) and the destination location (in this case, the area indicated by "b"). Responsive to this notification, the function module 11 performs direct memory access (DMA) so as to read data from the specified area in the memory 12. The function module 11 constructs a transfer frame as shown in FIG. 2 and transmits the same to the port P3 in synchronization with a data transmission clock, the MSB preceding the LSB.

Figure 2:
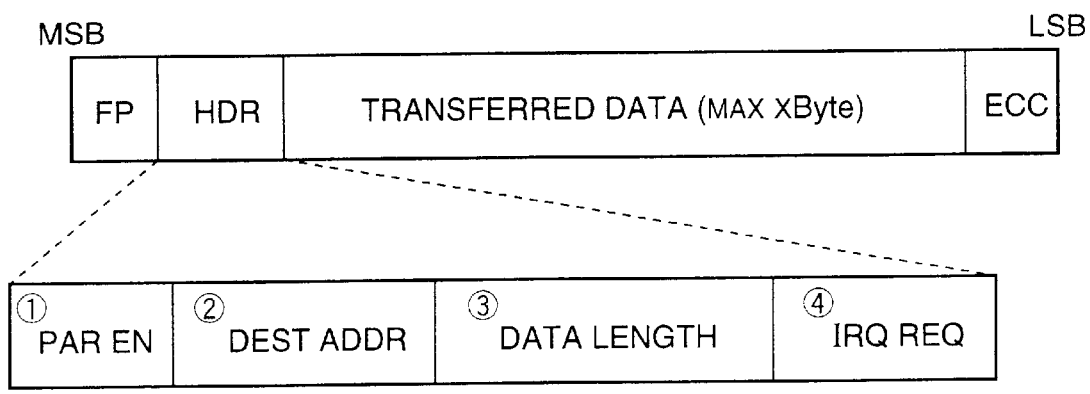
FIG. 2 shows a format of serially transferred data.

Referring to FIG. 2, a transfer frame consists of a flag pattern FP, a header HDR, variable-length transferred data with a maximum transferred packet length of x bytes, and an error check code ECC. The header comprises the following information:

(1) Parallel port information (PAR EN) indicating whether a plurality of ports are used for parallel transfer;

(2) Destination address information (DEST ADDR) indicating which area in the memory in the receiving function module receives the DMA transferred data;

(3) Data length information (DATA LENGTH) indicating the length of the transferred data included in the transfer frame; and (4) Interrupt request information (IRQ RQ) indicating whether the receiving function module is to provide an interrupt to the MPU in the same functional block, when the data is received.

Assuming that the maximum transferred packet length is x, transferred data with a packet length y that exceeds x is divided by the function module 11 into a plurality of packets such that the largest transferred packet length is x. Construction of data frames and transmission of the same are repeated until all the divided data has been transmitted. When data divided into a plurality of packets is transmitted, the destination address information (DEST ADDR) in the header (HDR) is sequentially incremented in the second and subsequent packets. Given that x is equal to 16 bytes, a 30-byte data transfer to an address k in the destination memory, for example, is performed such that first data (DEST ADDR=k, data length=16 bytes) is transmitted, followed by second data (DEST ADDR=k+16, data length= 14 bytes), so that the entire 30-byte is transmitted. When y<x, a packet which includes y bytes is transferred to the destination by itself. Data length information (DATA LENGTH) indicating the packet length is attached to each transferred packet.

Thus, by configuring a packet length of transferred data to be variable, and by prescribing a maximum packet length, error detection in individual transferred packets is enabled. Relatively small-sized data can be transferred with a reduced packet length.

The function module 31 in the functional block 3 is permanently in a "hunting" state. In other words, the function module 31 constantly monitors the flag pattern (FP) in the received data by synchronizing with the received clock. Upon detecting the flag pattern (FP), the function module 31 recognizes it as a head of a packet. The function module 31 then analyzes the header (HDR) subsequent to the flag pattern (FP) so as to receive transferred data subsequent to the header HDR in accordance with the data length information (DATA LENGTH). The function module 31 also compares ECC data calculated on the basis of the header (HDR) and the transferred data portion subsequent to the flag pattern (FP), with ECC data in the received packet, so as to check if any bit error has occurred in the transfer. Thereafter, the function module 31 DMA-transfers the received data to an address in the memory 32 in accordance with the destination address information (DEST ADDR). If the interrupt request information (IRQ REQ) indicates an interrupt request, the function module 31 provides an interrupt request (IRQ) to the MPU 30 after the DMA transfer.

Thus, by providing a bit in the transferred data which bit indicates whether an interrupt request should be generated to the transfer destination MPU, it is possible for MPUs in respective functional blocks to issue an interrupt to each other. This can be done without connecting the functional blocks with a signal line for interrupts.

A description will now be given of parallel data transfer between the functional block 1 and the functional block 2.

The benefit provided by the present invention is that, even when requirements for transferred data volume, data transfer rate and hardware scale differ from one transfer to another between functional blocks, it is not necessary to provide a data communication function module adapted for the destination module. Different requirements for data transfer can be processed by providing a plurality of connection ports in a function module.

A function module for controlling data transfer may be capable of controlling a total of n sets of data signal lines and clock signal lines. Depending on the system, the n sets of signal lines may be used to carry serial data or m-bit parallel data, where m<n. For example, as shown in FIG. 5 showing combinations of connection ports, a total of 5 combinations are available when n=4. Referring to FIG. 5, P1–P4 indicate physical port numbers in the function module, L1–L4 indicate logical port numbers, and 1–5 identify five modes. For example, in mode 2, the logical port L1 consists of two physical ports P1 and P2. The logical port L3 consists of the physical port P2, and the logical port L4 consists of the physical port P3. In mode 5, the logical port L1 consists of four physical ports P1–P4.

Referring to FIG. 1, given that the function module is capable of controlling a maximum of four ports, and transfer capacity (rate) of one physical port is s, and assuming that a transfer rate of (2×s) is required between the functional block 1 and the functional block 2, a transfer rate of s is required between the functional block 1 and the functional block 3, transfer between the functional block 1 and the functional block 2 could be 2-bit parallel (m=2) transfer and transfer between the functional block 1 and the functional block 3 could be serial (m=1) transfer corresponding to mode 2 of FIG. 5. When data is to be transferred from the memory 12 in the functional block 1 to the memory 22 in the functional block 2, the functional block 1 and the functional block 2 are connected as shown in FIG. 3. Each port is provided with four lines including a line for transmitting a DATA signal, a line for transmitting a CLK signal, a line for receiving a DATA signal and a line for receiving a CLK signal. A total of eight signal lines connect between the functional block 1 and the functional block 2.

Figure 4:
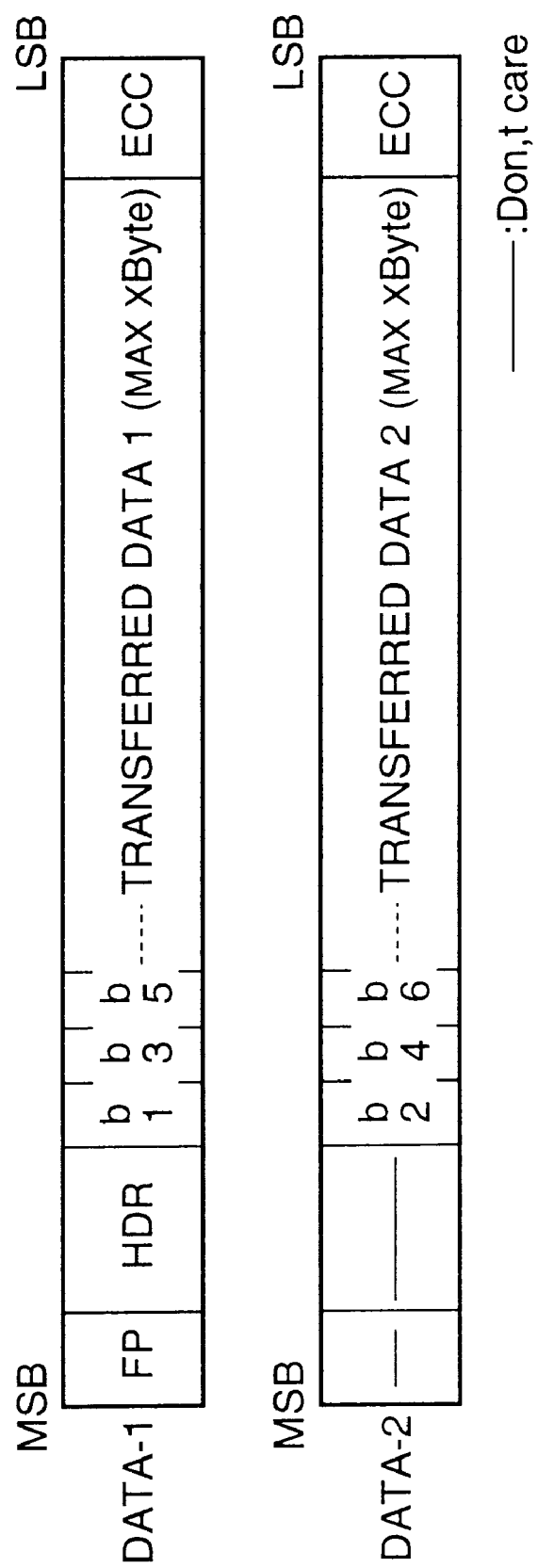
FIG. 4 shows a format of parallel data transferred.

In parallel communication, transferred data has a format as shown in FIG. 4. Only the data portion of transferred frames is transferred parallel to the two signal line sets. The flag pattern FP and the header HDR are supplied only to the port with the smallest physical port number (in this case, the port P1). In the other ports, fields for the flag pattern FP and the header HDR are disabled.

It will be assumed that the maximum transferred packet length is x, the length of data transferred m-bit parallel is y, the quotient of y divided by (x×m) is i and the remainder thereof is j. If i>1, i×(x×m) data is transferred i times, with (x×m) transferred at a time. The remaining j data is serially transferred via the port with the smallest physical port number. The parallel port information (PAR EN) in the header (HDR) is enabled only in packets transferred parallel. In the serially-transferred packet, the parallel port information is disabled.

In the functional blocks 1 and 2, data transfer from the physical ports P1 and P2 is conducted at the same time. In the functional block 2 on the receiving end, hunting of the flag pattern FP is conducted only at the port with the smallest physical port number. Upon detecting the flag pattern FP, it is determined that the flag pattern (FP) is detected at the other parallel connection ports as well at the same time. Only the header (HDR) values detected at the port with the smallest physical port number are enabled. At the other parallel connection ports, the header field is neglected. Only when the parallel port information (PAR EN) in the header HDR indicates "enabled", the ports other than that with the smallest physical port number process received data.

Thus, by assigning the frame synchronization information (FP and the like) and the communication control information (header and the like) in the transferred data to packets processed by a particular port only, disagreement between a plurality of ports in detecting the flag pattern FP and the header HDR, which disagreement is caused by detecting them at individual physical ports, is prevented. Therefore, prescriptions for data process in the event of an abnormality are not necessary.

The ECC field for detecting a bit error in the data is checked at each physical port so that bit error detection at individual physical ports is enabled.

More specifically, the transmitting side assigns an error check code ECC to a frame in order for a bit error in the transferred data to be detected. The receiving side checks the error check code ECC to detect a bit error. In parallel transfer, the error check code is assigned to packets processed at each of the individual ports. By checking the error check code thus assigned, it is possible for individual physical ports to detect an error.

If x=16 (bytes), y=35 (bytes) and m=2, then i=1, j=3. Data transfer between the functional blocks 1 and 2 occurs such that 32-byte data is transported parallel via the ports P1 and P2, with the parallel port information (PAR EN) being set to "enabled". The remaining 3-byte data is transferred serially via the port 1 after the parallel transfer. In the serial transfer, the parallel port information is set to "disabled". All the parallel connection ports in the functional block 2 (the ports P1 and P2) properly receive packets having the parallel port information set to "enabled". The port with the smallest physical port number (port P1) serially receives the packet having the parallel port information (PAR EN) set to "disabled". The received data is DMA-transferred to the destination memory 22.

Figure 6:
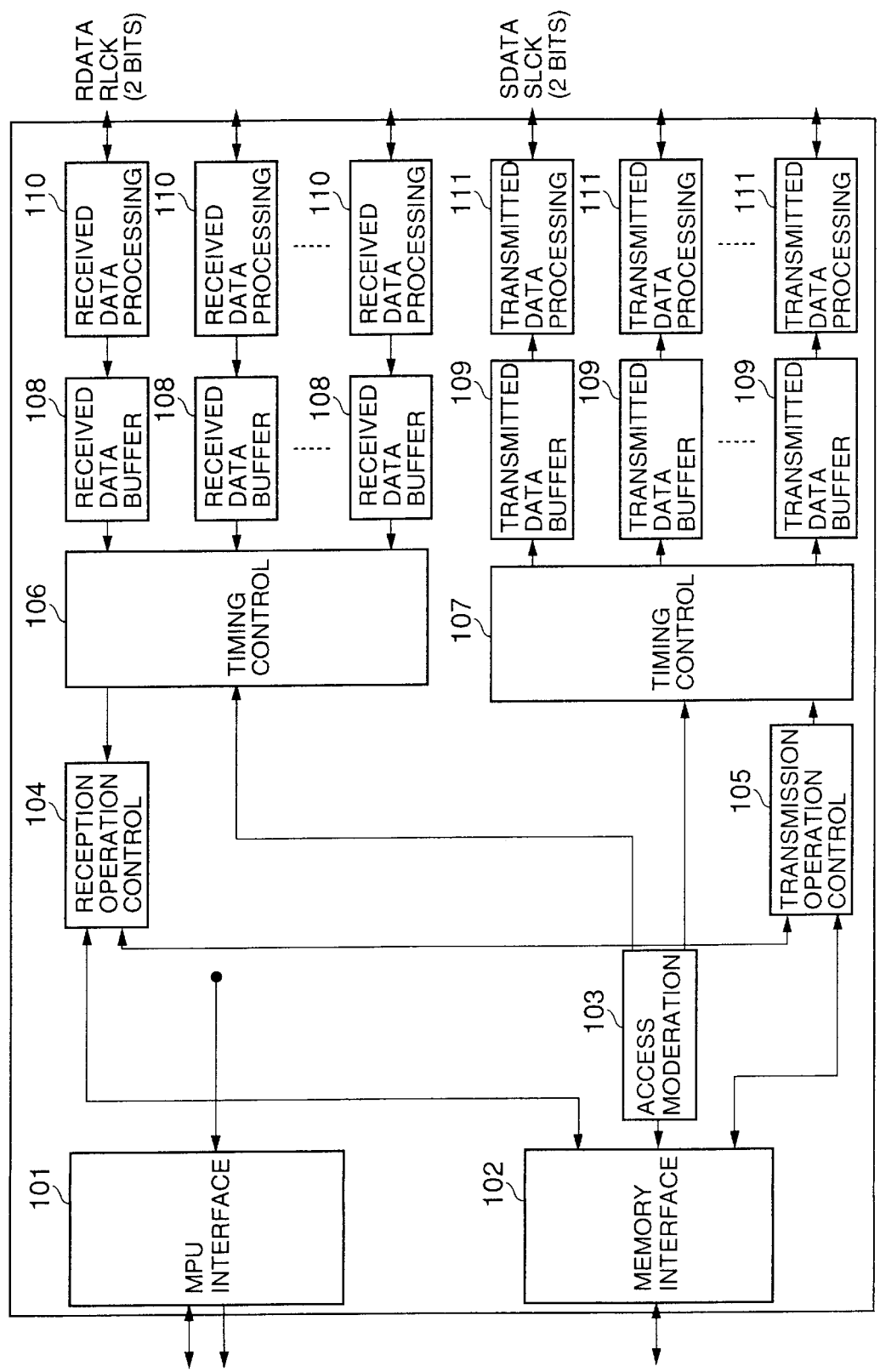
FIG. 6 shows a detailed construction of the function module.

FIG. 6 shows a detailed construction of the function module. Referring to FIG. 6, an MPU interface unit 101 allows the MPU to control the operation of the function module, a memory interface unit 102 effects memory address control in transmission and reception, an access moderator unit 103 effects memory access control in transmission and reception.

Received data processing units 110#1–110#n are provided for a plurality of ports P1–Pn, respectively. Each of the received data processing units 110#1–110#n receives a received data signal RDATA and a received data clock RCLK via the corresponding port. The received data processing units 110#1–110#n detect and analyze the received data, perform an error check by checking the error check code ECC, and manage received data buffers 108#1–108#n, respectively. Each of the received data buffers 108#1–108#n stores received packet data from the corresponding received data processing unit and has a capacity commensurate with the maximum packet length.

Transmitted data processing units 111#1–111#n are provided for a plurality of ports P1–Pn, respectively. Each of the transmitted data processing units 111#1–111#n receives a transmitted signal SDATA and a transmitted data clock SCLK for the corresponding port. The transmitted data processing units 111#1–111#n generate and insert the header, generate an error check code ECC, and manage transmitted data buffers 109#1–109#n, respectively. Each of the transmitted data buffers 109#1–109#n stores transmitted packet data for the corresponding transmitted data processing unit and has a capacity commensurate with the maximum packet length.

A reception timing control unit 106 controls timing of the operation of the received data processing units 110#1–110#n and also controls writing in the received data buffers 108#1–108#n, in accordance with an instruction from a reception operation control unit 104. A transmission timing control unit 107 controls timing of the operation of the transmitted data processing units 111#1–111#n and also controls reading from the transmitted data buffers 109#1–109#n, in accordance with an instruction from a transmission operation control unit 105.

The reception operation control unit 104 is a circuit for controlling the reception operation in accordance with an operation mode (see FIG. 5) specified by the system. Likewise, the transmission operation control unit 105 is a circuit for controlling the transmission operation in accordance with the operation mode.

FIG. 7 shows a detailed construction of the reception operation control unit 104. As shown in FIG. 7, the reception operation control unit 104 comprises: an operation mode register 1041 in which an operation mode is set and which outputs, in the form of n-bit parallel information, the operation mode to a header data check unit 1042, a packet count counter 1044 and the reception timing control unit 106; a header data check unit 1042 for checking the header information in the received frame; a packet length counter 1043 for determining a packet length on the basis of the packet length information (DATA LENGTH) in the received frame; and a packet count counter 1044 for determining the number of received packets on the basis of a count of the packet length counter 1043. The header data check unit 1042 receives header data and a reception timing from the reception timing control unit 106 and receives a count from the packet length counter 1043 and the packet count counter 1044, so as to analyze the received information. The header data check unit 1042 delivers destination address information (DEST ADDR), a data write pulse and interrupt request information (IRQ REQ) to the access moderator unit 103. The header data check unit 1042 also delivers parallel port information (PAR EN) and data length information (DATA LENGTH) to the packet length counter 1043 and the packet count counter 1044.

FIG. 8 shows a detailed construction of the transmission operation control unit 105. As shown in FIG. 8, the transmission operation control unit 105 comprises: an operation mode register 1051 in which an operation mode is set and which outputs, in the form of n-bit parallel information, the operation mode to a header data generation unit 1052, a packet length counter 1053, a packet count counter 1054 and the transmission timing control unit 106; a header data generation unit 1052 for generating header information for the transmitted frame based on the operation mode set in the operation mode register 1051 and based on a count of the packet length counter 1053 and the packet count counter 1054; a packet length counter 1053 for receiving a data read pulse from the access moderator unit 103 so as to determine a packet length of the transferred data frame; and a packet count counter 1054 for determining the number of transmitted packets on the basis of a count of the packet length counter 1053. The packet length counter 1053 receives a data read pulse from the access moderator unit 103. The header data generation unit 1052 receives counts from the packet length counter 1053 and the packet count counter 1054 and also receives the operation mode information from the operation mode register 1051 so as to generate header data on the basis of the received information. The header data generation unit 1052 delivers the header data to the transmission timing control unit 107. The count of the packet length counter 1053 is output to the transmission timing control unit 107 and the transmitted data processing unit.

With this arrangement, the function module has hardware capability of automatically dividing data into a plurality of packets before transfer if the size of data transferred exceeds the maximum packet length. As a result, the MPU is capable of data transfer irrespective of the maximum packet length.

The present invention is not limited to the above-described embodiment and variations and modifications may be made without departing from the scope of the present invention.

What is claimed is:

1. A data transfer system for transferring data between a plurality of functional blocks, each of said plurality of functional blocks comprising:

a memory for storing incoming and outgoing data;

a processor for processing data; and a function module for controlling data transfer between said memory of each of said plurality of functional blocks, said function module being connected to a function module of other functional blocks via n sets of data signal lines and clock signal lines so that the data transfer proceeds in a synchronized manner, wherein each of the n sets of data signal lines and clock signal lines is combined with one another depending on a required condition for communicating with destination functional blocks, such that a plurality of sets of data signal lines and clock signal lines are used for parallel transfer and a single set of a data signal line and a clock signal line is used for serial transfer.

2. The data transfer system as claimed in claim 1, wherein, for parallel transfer, synchronization information identifying a head of a frame of transferred data is carried only in a single set of a data signal line and a clock signal line.

3. The data transfer system as claimed in claim 1, wherein, in parallel transfer, communication control information in transferred data is carried only in a single set of a data signal line and a clock signal line.

4. The data transfer system as claimed in claim 1, wherein said functional block on a transmitting end inserts an error check code in a frame of transferred data so that said functional block on a receiving end can detect a bit error in the frame of the transferred data, and the error check code is carried in said plurality of sets of data signal lines and clock signal lines used in the parallel transfer.

5. The data transfer system as claimed in claim 1, wherein transferred data is divided into a plurality of transferred packets such that each transferred packet has a variable packet length less than a maximum packet length, thus enabling error detection in individual transferred packets and reduction in a packet length when a size of the data transferred is relatively small.

6. The data transfer method as claimed in claim 5, wherein said function module has hardware capability of automatically dividing the transferred data into a plurality of transferred packets before the data transfer, when the packet length of the transferred data exceeds the maximum packet length.

7. The data transfer system as claimed in claim 1, wherein information for one of enabling and disabling an interruption to said processor in a data transfer destination functional block is inserted in the transferred data so that a first processor of a first functional block is capable of generating an interruption to a second processor of a second functional block and said second processor of said second functional block is capable of generating an interruption to a said first processor of said first functional block.

* * * * *

UNITED STATES PATENT AND TRADEMARK OFFICE
CERTIFICATE OF CORRECTION

PATENT NO.: 6,021,450
DATED : February 1, 2000
INVENTOR(S): Jinichi YOSHIZAWA et al.

It is certified that error appears in the above-identified patent and that said Letters Patent is hereby corrected as shown below:

Col. 8, line 51 through col. 9, line 3, delete claim 1 and substitute therefor the following correct version of claim 1:

1. A data transfer system for transferring data, comprising:
a plurality of functional blocks, each of said plurality of functional blocks comprising:
    a memory storing incoming and outgoing data ,
    a processor processing data , and
    a first function module, of a first of said plurality of functional blocks, controlling data transfer between said memory of said respective first functional block and each of said respective memories of others of said plurality of functional blocks ; and
n sets of data signal lines and clock signal lines interconnecting the first function module and the respective function modules of the others of said plurality of functional blocks so that the data transfer proceeds in a synchronized manner , and each of the n sets of data signal lines and clock signal lines being combined with one another, depending on a required condition for communicating with destination functional blocks and such that a plurality of sets, of data signal lines and respective clock signal lines, are used for parallel transfer and a single set, of a data signal line and a clock signal line, is used for serial transfer.

UNITED STATES PATENT AND TRADEMARK OFFICE
CERTIFICATE OF CORRECTION

PATENT NO.: 6,021,450
DATED : February 1, 2000
INVENTOR(S): Jinichi YOSHIZAWA et al.

It is certified that error appears in the above-identified patent and that said Letters Patent is hereby corrected as shown below:

Col. 9, line 12 through col. 10, line 19, delete each of claims 4, 5, 6 and 7 and substitute therefor the following correct versions of those claims:

4. The data transfer system as claimed in claim 1, wherein:
said functional block, on a transmitting end, inserts an error check code in a frame of transferred data so that said functional block, on a receiving end, can detect a bit error in the frame of the transferred data ; and
the error check code is carried in said plurality of sets of data signal lines and clock signal lines used in the parallel transfer.

5. The data transfer system as claimed in claim 1, wherein:
transferred data is divided into a plurality of transferred packets such that each transferred packet has a respective, variable packet length less than a maximum packet length, enabling error detection in individual transferred packets and reduction in a packet length when a size of the data transferred is relatively small.

6. The data transfer method as claimed in claim 5, wherein said function module has a hardware capability of automatically dividing the transferred data into a plurality of transferred packets, before the data transfer, when the packet length of the transferred data exceeds the maximum packet length.

UNITED STATES PATENT AND TRADEMARK OFFICE
CERTIFICATE OF CORRECTION

PATENT NO.: 6,021,450
DATED : February 1, 2000
INVENTOR(S): Jinichi YOSHIZAWA et al.

It is certified that error appears in the above-identified patent and that said Letters Patent is hereby corrected as shown below:

7. The data transfer system as claimed in claim 1, wherein information for one of enabling and disabling an interruption to said processor, in a data transfer destination functional block, is inserted in the transferred data so that a first processor of a first functional block generates an interruption to a second processor of a second functional block, and said second processor of said second functional block generates an interruption to said first processor of said first functional block.

Signed and Sealed this

Twenty-first Day of November, 2000

Attest:

Q. TODD DICKINSON

*Attesting Officer*   *Director of Patents and Trademarks*